United States Patent
Dinh et al.

(10) Patent No.: US 8,311,485 B2
(45) Date of Patent: Nov. 13, 2012

(54) METHOD AND SYSTEM FOR RECEIVER NULLING USING COHERENT TRANSMIT SIGNALS

(75) Inventors: Erik Lee Dinh, Boca Raton, FL (US); Adam S. Bergman, Boca Raton, FL (US); Manuel A. Soto, Lake Worth, FL (US); Stanley A. Strzelec, Delray Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 486 days.

(21) Appl. No.: 12/686,729

(22) Filed: Jan. 13, 2010

(65) Prior Publication Data

US 2011/0171910 A1    Jul. 14, 2011

(51) Int. Cl.
  *H04B 1/00*    (2006.01)
(52) U.S. Cl. .............. 455/63.1; 455/114.2; 455/278.1; 370/210
(58) Field of Classification Search ............ 455/63.1, 455/114.2, 278.1, 272, 277.1, 269, 103, 91, 455/296; 370/210, 201
  See application file for complete search history.

(56) References Cited

U.S. PATENT DOCUMENTS

| | | | | |
|---|---|---|---|---|
| 3,911,389 | A * | 10/1975 | Mills | 340/941 |
| 4,201,959 | A * | 5/1980 | Niiro et al. | 333/16 |
| 4,719,623 | A * | 1/1988 | Leyser | 370/509 |
| 5,107,273 | A * | 4/1992 | Roberts | 342/417 |
| 5,349,339 | A | 9/1994 | Kind | |
| 5,699,045 | A | 12/1997 | Frederick et al. | |
| 6,404,758 | B1 * | 6/2002 | Wang | 370/342 |
| 6,661,835 | B1 * | 12/2003 | Sugimoto et al. | 375/148 |
| 6,781,520 | B1 * | 8/2004 | Smith et al. | 340/853.1 |
| 6,998,908 | B1 * | 2/2006 | Sternowski | 329/320 |
| 7,002,897 | B2 * | 2/2006 | Jones et al. | 370/201 |
| 7,016,438 | B2 * | 3/2006 | Kurokami | 375/346 |
| 7,092,684 | B2 * | 8/2006 | Szopko et al. | 455/114.2 |
| 7,096,042 | B2 * | 8/2006 | Marinier | 455/562.1 |
| 7,116,267 | B2 * | 10/2006 | Schuster et al. | 342/174 |
| 7,242,720 | B2 * | 7/2007 | Sugiyama et al. | 375/260 |
| 7,259,700 | B2 * | 8/2007 | Heeb | 341/61 |

(Continued)

FOREIGN PATENT DOCUMENTS

EP    0602316 A1    6/1994

(Continued)

OTHER PUBLICATIONS

International Search Report and Written Opinion dated May 4, 2011 for International Application No. PCT/US2010/003241, International Filing Date: Dec. 23, 2010 consisting of 13-pages.

*Primary Examiner* — Minh D Dao
(74) *Attorney, Agent, or Firm* — Alan M. Weisberg; Christopher & Weisberg, P.A.

(57) ABSTRACT

A method and system are provided for canceling interference signals from a received signal. A ratio module receives as input a ratio of a filtered receiver output signal level and a filtered transmitter output signal level. A product module receives as inputs an output of the ratio module and a transmitter output. The product module calculates a product of the output of the ratio module and the transmitter output. An adjusted receiver signal module receives a difference calculated from the received signal level and the output of the product module. The method and system are suitable for use in a metal detection subsystem with a larger security system.

20 Claims, 3 Drawing Sheets

U.S. PATENT DOCUMENTS

| | | | |
|---|---|---|---|
| 7,460,059 B1 * | 12/2008 | Ormesher et al. | 342/159 |
| 7,542,446 B2 * | 6/2009 | Mehta et al. | 370/330 |
| 7,639,616 B1 * | 12/2009 | Manula et al. | 370/235 |
| 7,742,386 B2 * | 6/2010 | Jones et al. | 370/201 |
| 7,937,057 B2 * | 5/2011 | Kishigami et al. | 455/278.1 |
| 2006/0034162 A1 * | 2/2006 | Jones et al. | 370/201 |
| 2008/0013747 A1 * | 1/2008 | Tran | 381/67 |
| 2008/0079457 A1 | 4/2008 | Alicot et al. | |
| 2009/0325509 A1 | 12/2009 | Mattisson et al. | |
| 2010/0001872 A1 | 1/2010 | Lian et al. | |
| 2011/0208833 A1 * | 8/2011 | Fallon | 709/217 |
| 2011/0256857 A1 * | 10/2011 | Chen et al. | 455/422.1 |

FOREIGN PATENT DOCUMENTS

| | | |
|---|---|---|
| WO | 2009014281 A1 | 1/2009 |

* cited by examiner

METHOD AND SYSTEM FOR RECEIVER NULLING USING COHERENT TRANSMIT SIGNALS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a method and system for improving a signal to noise ratio in electronic theft detection systems, and more specifically to a method and system for detecting power line fluctuations received at metal detection system transmitters and using the detected power line fluctuations to cancel signal fluctuations at metal detection system receivers to improve signal to noise ratios.

BACKGROUND OF THE INVENTION

Electronic Article Surveillance ("EAS") systems are detection systems that allow the detection of markers or tags within a given detection region. EAS systems have many uses. Most often EAS systems are used as security systems to signal shoplifting of items from stores or signal removal of property from office buildings. EAS systems come in many different forms and make use of a number of different technologies.

Typical EAS systems include an electronic detection unit, markers and/or tags, and a detacher or deactivator. The detection unit includes transmitter and receiver antennas and is used to detect any active markers or tags brought within range of the detection unit. The antenna portions of the detection units can, for example, be bolted to floors as pedestals, buried under floors, mounted on walls, or hung from ceilings. The detection units are usually placed in high traffic areas, such as entrances and exits of stores or office buildings. The deactivators transmit signals used to detect and/or deactivate the tags.

The markers and/or tags have special characteristics and are specifically designed to be affixed to or embedded in merchandise or other objects sought to be protected. When an active marker passes through the detection unit, an alarm is sounded, a light is activated, and/or some other suitable control devices are set into operation indicating the removal of the marker from the proscribed detection region covered by the detection unit.

Most EAS systems operate using the same general principles. The detection unit includes one or more transmitters and receivers. The transmitter sends a signal at defined frequencies across the detection region. For example, in a retail store, placing the transmitter and receiver on opposite sides of a checkout aisle or an exit usually forms the detection region. When a marker enters the region, it creates a disturbance to the signal being sent by the transmitter. For example, the marker may alter the signal sent by the transmitter by using a simple semiconductor junction, a tuned circuit composed of an inductor and capacitor, soft magnetic strips or wires, or vibrating resonators. The marker may also alter the signal by repeating the signal for a period of time after the transmitter terminates the signal transmission. This disturbance caused by the marker is subsequently detected by the receiver through receipt of a signal having an expected frequency, the receipt of a signal at an expected time, or both. As an alternative to the basic design described above, the receiver and transmitter units, including their respective antennas, can be mounted in a single housing.

Magnetic materials or metal, such as metal shopping carts, placed in proximity to the EAS marker or the transmitter may interfere with the optimal performance of the EAS system. Further, some unscrupulous individuals utilize EAS marker shielding to shoplift merchandise without detection by EAS system. Metal can shield tagged merchandise from the EAS detection system by preventing an interrogation signal from reaching the tags or preventing a reply signal from reaching the EAS system. When a shielded marker passes through the detection unit, the EAS system is not able to detect the marker. As a result, shoplifters are able to remove articles from stores without activating an alarm.

Metal detection systems are used in conjunction with EAS systems to detect the presence of metal objects such as shielded bags or shopping carts. The metal detection systems may use transmitters and receivers in common with the EAS system. For metal detection, the transmitter sends a signal across the detection region at a predefined metal detection frequency. When a metal object enters the detection region, it creates a disturbance to the signal being sent by the transmitter. This disturbance caused by the metal object is subsequently detected by the receiver through receipt of a modified signal. Upon detection of the modified signal, an alarm is sounded, a light is activated, and/or some other suitable control devices are set into operation indicating the presence of metal in a detection region.

The metal detection systems are sensitive to interference signals introduced through power lines, including sudden spikes in electrical current or other fluctuations on the power lines. Conventional metal detection systems are inclined to producing false alarm signals when subjected to power line interference signals. What is needed is a system and method of detecting and canceling power line interference signals in metal detection systems to reduce occurrences of false alarm trigger signals.

SUMMARY OF THE INVENTION

The present invention advantageously provides a method and system for canceling interference signals introduced into a transmitted wireless signal and propagated to the signal received at a corresponding receiver.

According to one embodiment, the present invention provides a system for canceling interference signals from a received signal. A ratio module receives as input a ratio of a filtered receiver output signal level and a filtered transmitter output signal level. A product module receives as inputs an output of the ratio module and a transmitter output. The product module calculates a product of the output of the ratio module and the transmitter output. An adjusted receiver signal module receives a difference calculated from the received signal level and the output of the product module.

According to another embodiment, the present invention provides a method for canceling interference signals introduced into a transmitted wireless signal. The method includes determining a filtered transmitter value, determining a filtered receiver value and calculating a ratio of the filtered receiver value and the filtered transmitter value. A real-time transmitter value is multiplied by the ratio to produce a product value and a difference is calculated between the product value and a real-time receiver value. A corrected receiver value is provided that cancels interference signals introduced into the transmitted signal.

According to yet another embodiment, the present invention provides a security system. The security system includes at least one antenna, an electronic surveillance system that uses the at least one antenna to detect the presence of active markers and a metal detection system that uses the at least one antenna to detect metallic objects. The metal detection system includes a ratio module that receives as input a ratio of a filtered receiver output signal level and a filtered transmitter output signal level. A product module receives as inputs an output of the ratio module and a transmitter output. The product module calculates a product of the output of the ratio module and the transmitter output. An adjusted receiver signal module receives a difference calculated from the received signal level and the output of the product module.

Additional aspects of the invention will be set forth in part in the description which follows, and in part will be obvious from the description, or may be learned by practice of the invention. The aspects of the invention will be realized and attained using the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Before describing in detail exemplary embodiments that are in accordance with the invention, it is noted that the embodiments reside primarily in combinations of apparatus components and processing steps related to implementing a system and method for reducing false alarm signals by detecting and canceling interference signals received in metal detection systems.

The system and method components are represented by conventional symbols in the drawings, where appropriate. The drawings show only those specific details that are pertinent to understanding the embodiments of the invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element, without necessarily requiring or implying any physical or logical relationship or order between such entities or elements.

Metal detection systems transmit signals across the detection region at a predefined metal detection frequency. When metal objects are present in the detection region, the signals that are sent by the transmitter are disturbed. This disturbance is subsequently detected by a receiver of the metal detection system, which receives the modified signals. The metal detection system may process the modified signals and generate an alert, such as sounding an alarm, activating a light, and/or generating other alerts.

The metal detection systems may pick up interference signals through power lines, including sudden spikes in electrical current or other fluctuations on the power lines. If the metal detection system transmits signals into the interrogation zone with overriding interference signals, then the signals received at the metal detection receiver may include the interference signals. The interference signals may deteriorate system performance, including causing the receiver to generate false alarm signals.

One embodiment of the invention advantageously provides a method and system for detecting the interference signals introduced through the metal detection system transmitter and canceling the interference signals at the metal detection system receiver to reduce occurrences of false alarm signals, improve signal to noise ratios and provide other advantages. According to one embodiment, the interference signals detected at the receiver are synchronously related to the interference signals introduced at the transmitter. For example, a ratio between the receiver signal levels and the transmitter signal levels may be constant throughout a detection period. Furthermore, the coherent relationship between the transmitted signals and received signals may be applied to reduce false alarm signals resulting from power line dips.

The EAS systems detect markers that pass through a predefined detection area (also referred to as an interrogation zone). The markers may include strips of melt-cast amorphous magnetic ribbon, among other marker types. Under specific magnetic bias conditions, the markers receive and store energy, such as acousto-magnetic field energy, at their natural resonance frequency. When a transmitted energy source is turned off, the markers become signal sources and radiate the energy, such as acousto-magnetic ("AM") energy, at their resonant frequency. The EAS system is configured to detect the AM energy transmitted by the markers, along with other energy sources.

One embodiment of the present invention advantageously provides a method and system for detecting the presence of metal in a security system interrogation zone and determining whether the detected metal is an EAS marker shield. The security system combines traditional EAS detection capabilities with metal detection to improve the accuracy of the security system, thereby reducing the likelihood of false alarms.

Figure 1:
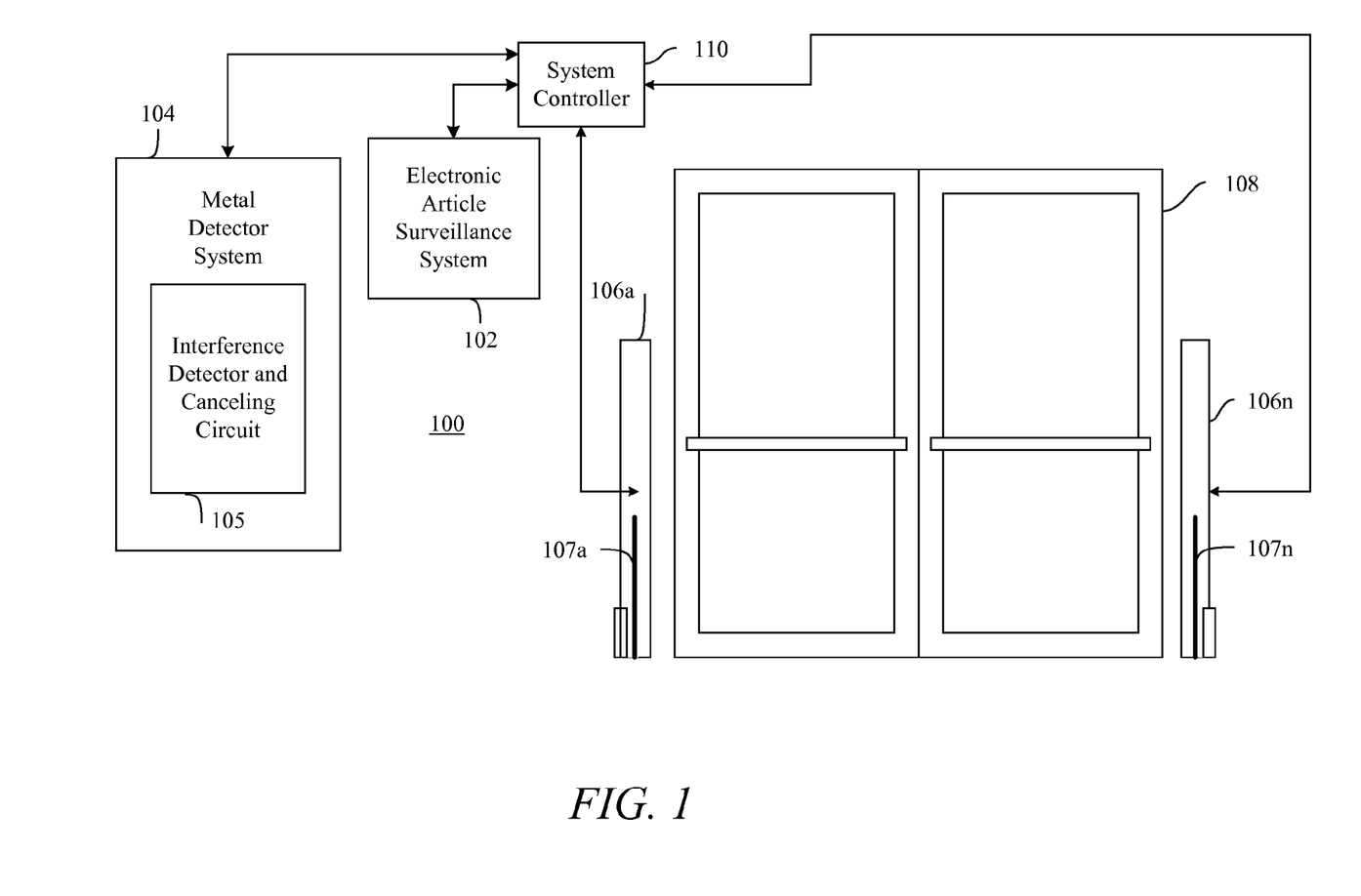
FIG. 1 is a block diagram of an exemplary security system having an EAS detection and metal detection capabilities constructed in accordance with the principles of the invention.

Referring now to the drawing figures where like reference designators refer to like elements, there is shown in FIG. 1 a security system constructed in accordance with the principles of the invention and designated generally "100." The security system 100 may be located at a facility entrance, among other locations. The security system 100 may include an EAS system 102, a metal detection system 104, and a pair of pedestals 106a, 106n (collectively referenced as pedestals 106) positioned on opposing sides of an entrance 108, for example. The metal detection system 104 may include an interference detector and canceling circuit 105. The operation of which is discussed below in detail. One or more antennas 107a, 107n (collectively referenced as antennas 107) may be included in pedestals 106. The antennas may be positioned a known distance apart for use by the EAS system 102 and the metal detection system 104. A system controller 110 is provided to control the operation of the security system 100 and is electrically coupled to the EAS system 102, the metal detection system 104, and the antennas 107, among other components. Of note, although the interference detector and canceling circuit 105 is shown in FIG. 1 as being a part of the metal detection system 104, it is contemplated that the interference detector and canceling circuit 105 can be separate or included in other elements of the system 100, e.g., as part of the system controller 110. Also, although the EAS system 102, the metal detection system 104 and the system controller 110 are shown as separate elements, such presentation is for ease of understanding and is not intended to limit the scope of the invention. It is contemplated that the EAS system 102, the metal detection system 104 and the system controller 110 can be incorporated in fewer or more than three physical housings.

According to one embodiment, the EAS system 102 applies a transmission burst and listening arrangement to detect objects, such as markers. The detection cycle may be 90 Hz (11.1 msec), among other detection cycles. The detection cycle may include four time periods that include a transmission window, a tag detection window, a synchronization window and a noise window. The detection cycle may operate in accordance with principles known to one of ordinary skill in the art.

According to one embodiment, a metal detection system 104 is provided and may share hardware components with the EAS system 102. Accordingly, the metal detection system 104 may share antennas 107 with the EAS system 102. For example, the antennas 107 may be employed as transmitting antennas for both the EAS system 102 and the metal detection system 104. The metal detection system 104 may monitor the signal for induced eddy currents that indicate the presence of metal objects located proximate to the antennas 107. Typically, for good conductors, the induced eddy currents dissipate in approximately tens of microseconds. By comparison, eddy currents dissipate approximately two orders of magnitude faster than the AM energy for acoustic markers.

The EAS system 102 and the metal detection system 104 may be designed to operate at different frequencies. For example, the EAS system 102 may operate at 58 kHz, while the metal detection system 104 may operate at 56 kHz. One of ordinary skill in the art will readily appreciate that these systems may operate at other frequencies. In order to avoid mutual interference during operation, the signals generated by the EAS system 102 and the metal detection system 104 are separated by at least the detection period, such as $\frac{1}{90}$ Hz or more.

The metal detection system 104 may experience signal distortion due to interference signals, including radio frequency interference signals, magnetic interference signals, power line interference signals, among other interference signals. For example, power line interference signals may result from a number of sources including sudden spikes in electrical current, random fluctuations in alternating current, inferior or damaged wiring, interference from other machines or appliances, fluorescent lighting, lightening strikes on the power grid and bad weather conditions, among other power line interference signals. Signal distortion from the interference signals may cause the metal detection system 104 to operate incorrectly, including generating false alarm signals or other undesired signals.

Figure 2:
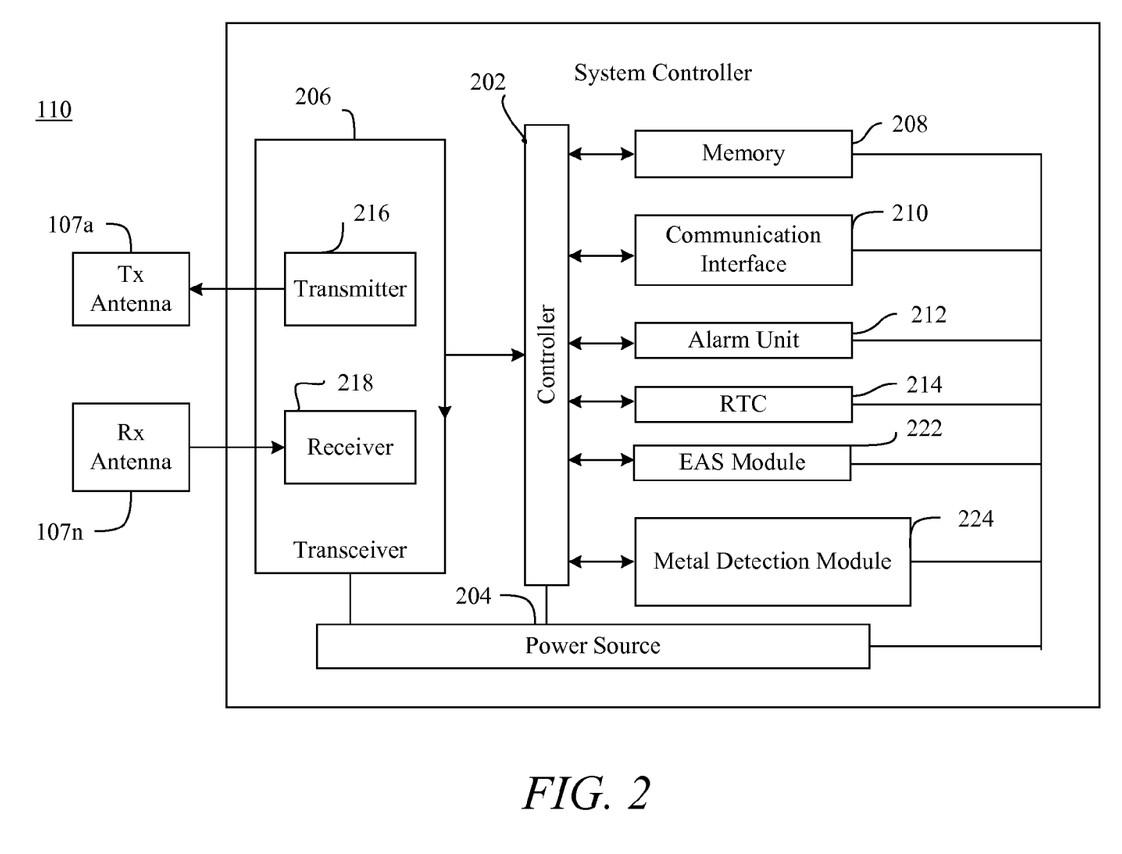
FIG. 2 is a block diagram of an exemplary EAS system controller constructed in accordance with the principles of the present invention.

Referring now to FIG. 2, the system controller 110 may include a controller 202 (e.g., a processor or microprocessor), a power source 204, a transceiver 206, a memory 208 (which may include non-volatile memory, volatile memory, or a combination thereof), a communication interface 210, an alarm unit 212, a real-time clock ("RTC") 214, an electronic article surveillance module 222 and a metal detector module 224. The electronic article surveillance module 222 communicates with the electronic article surveillance system 102 and the metal detector module 224 communicates with the metal detector system 104 and the interference detector and canceling circuit 105. Operation of the interference detector and canceling circuit 105 is described in greater detail below.

The system components may be of modular construction to facilitate adding, deleting, updating and/or amending modules therein and/or features within modules. It should be readily understood that any number of modules might be used and that the modules may be software applications implemented on processors. One skilled in the art will readily appreciate that the invention may be implemented using individual modules, a single module that incorporates the features of two or more separately described modules, individual software programs, and/or a single software program.

The controller 202 controls operations performed by the system controller 110, including radio communications, data storage to memory 208, communication of stored data to other devices, and activation of the alarm unit 212, among other operations. The power source 204 may provide DC voltage or AC voltage to the system 100, among performing other operations. For example, the power source 204 may supply electricity to the system controller 110. The alarm unit 212 may include software and/or hardware that provide alerts, such as visual and/or audible alerts, in response to detecting EAS markers and/or metal objects within the interrogation zone of the system 100.

The transceiver 206 may include a transmitter 216 electrically coupled to one or more transmitting antennas 107a and a receiver 218 electrically coupled to one or more receiving antennas 107n. According to one embodiment, a single antenna or a pair of antennas may be used as both the transmitting antenna 107a and the receiving antenna 107n. The transmitter 216 transmits a radio frequency signal using the transmit antenna 107a to "energize" an EAS marker and/or detect the presence of metal objects within the interrogation zone of the system 100. The receiver 218 detects response signals from the EAS markers and/or the response signals from metal objects using the receive antenna 107n. According to one embodiment, all or portions of the interference detector and canceling circuit 105 may be implemented on the receiver 218 using a digital signal processor ("DSP") or other hardware structure.

The communication interface 210 may be provided to facilitate communication between the various components of the system 100. For example, the communication interface 210 may transmit data between the receiver 218 and the metal detector system 104 through the metal detection module 224. According to one embodiment, the metal detection module 224 may include the metal detector system 104 and the interference detector and canceling circuit 105. If measured values of the response signals from the EAS markers and/or the response signals from metal objects exceed predefined threshold values, the controller 202 may trigger the alarm unit 212 to activate an alert signal. The communication interface 210 and/or alarm unit 212 may send an alert signal to a device that alerts store security or other authorized personnel who may monitor or approach the individual as warranted.

According to one embodiment, a real-time clock ("RTC") 214 may be electrically coupled to the controller 202 to monitor the passage of time. The RTC 214 may be used to generate a time stamp that enables logging of alarm event occurrences and/or other event occurrences.

Figure 3:
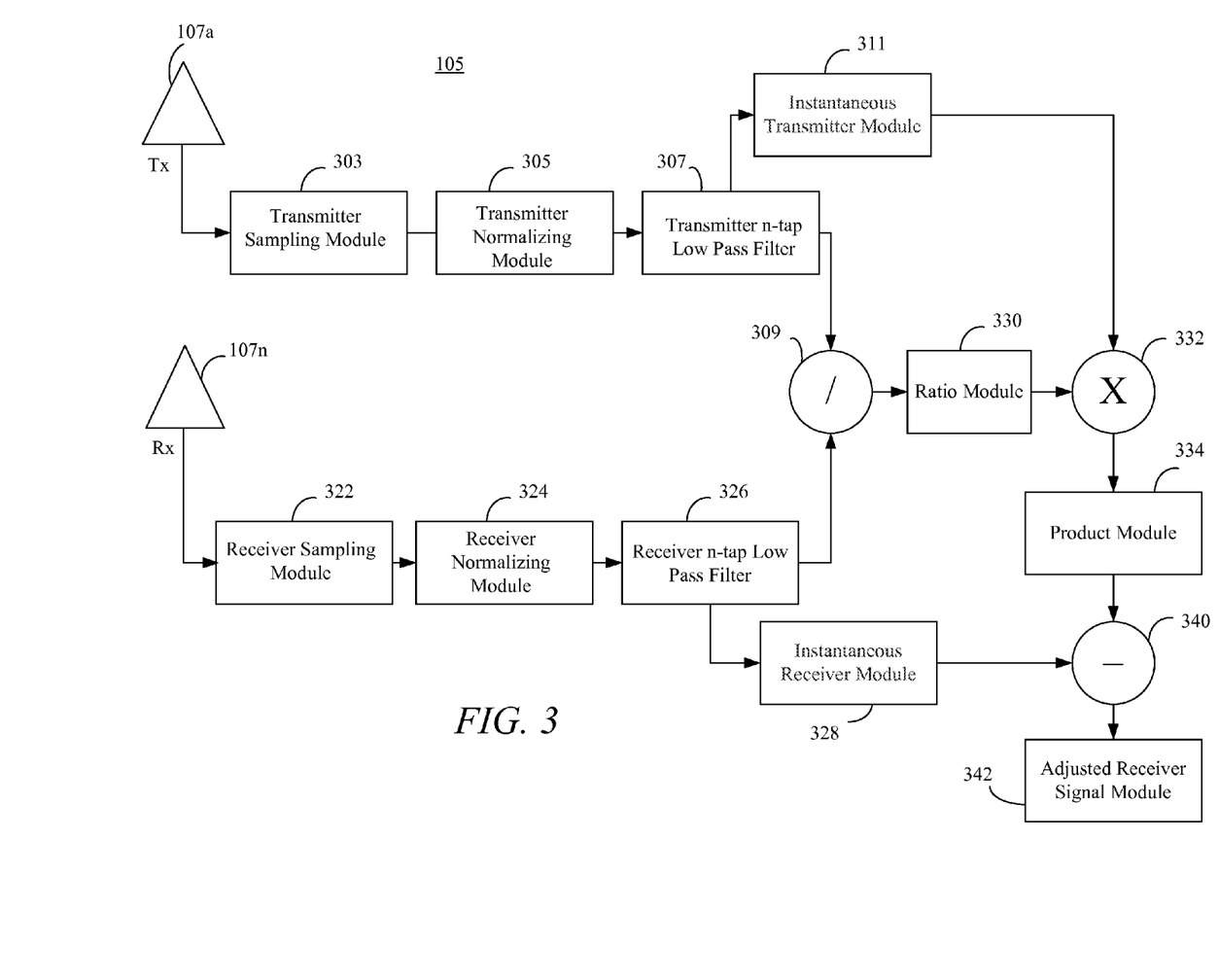
FIG. 3 is an exemplary schematic diagram of an interference detection and cancelling circuit according to the principles of the invention.

FIG. 3 is a schematic diagram of an exemplary interference detector and canceling circuit 105. According to one embodiment, a transmitter sampling module 303 extracts a predetermined number of sample values from signals that are to be transmitted from antenna 107a. The signal sample values may represent signal amplitude or some other measurable feature of the transmitted signal. The transmitter sampling module 303 may operate at frequencies between 46 kHz and 96 kHz. For example, the transmitter sampling module 303 may operate at a frequency of 46.296 kHz and may extract sixteen (16) sample values representing signal amplitude. One of ordinary skill in the art will readily appreciate that the transmitter sampling module 303 may operate at other frequencies and may extract a different number of sample values.

A transmitter normalizing module 305 receives the plurality of sample values from the transmitter sampling module 303 and provides a single value to a transmitter n-tap low pass filter (LPF) 307. According to one embodiment, the transmitter n-tap LPF 307 may include a 50-tap LPF. One of ordinary skill in the art will readily appreciate that different n-tap values may be used for the transmitter n-tap LPF 307. The transmitter n-tap LPF 307 performs an averaging function of the single sample value obtained from the transmitter normalizing module 305 with n−1 previously stored single sample values. An output from the transmitter n-tap LPF 307 is referred to as a filtered transmitter output and is provided to a division module 309. The transmitter normalizing module 305 further provides a single instantaneous transmitter value to a steady state or instantaneous transmitter module 311.

A receiver sampling module 322 is provided that extracts a predetermined number of sample values from signals that are received at antenna 107n. The signal sample values may represent signal amplitude or some other measurable feature of the received signal. According to one embodiment, the receiver sampling module 322 may operate at frequencies between 46 kHz and 96 kHz. For example, the receiver sampling module 322 may operate at a frequency of 46.296 kHz and may extract sixteen (16) sample values representing signal amplitude. One of ordinary skill in the art will readily appreciate that the receiver sampling module 322 may operate at other frequencies and may extract a different number of sample values.

A receiver normalizing module 324 receives the plurality of sample values from the receiver sampling module 322 and provides a single value to a receiver n-tap low pass filter (LPF) 326. According to one embodiment, the receiver n-tap LPF 326 may include a 50-tap LPF. One of ordinary skill in the art will readily appreciate that different n-tap values may be used for the receiver n-tap LPF 326. The receiver n-tap LPF 326 performs an averaging function of the single sample value obtained from the receiver normalizing module 324 with n−1 previously stored single sample values. An output from the receiver n-tap LPF 326 is referred to as a filtered receiver output and is provided to the division module 309. The receiver normalizing module 324 further provides a single instantaneous receiver value to a steady state or instantaneous receiver module 328.

According to one embodiment, the division module 309 calculates a quotient through dividing the filtered receiver output by the filtered transmitter output or (filtered Rx/filtered Tx). The quotient is stored in a ratio module 330. A multiplication module 332 is provided to receive an output from the ratio module 330 and from the instantaneous transmitter module 311. The multiplication module 332 calculates a product between the value stored in the ratio module 330 and the single instantaneous transmitter value or (Tx*(filtered Rx/filtered Tx)). The output from the multiplication module 332 is stored in a product module 334.

A subtraction module 340 is provided to receive an output from the product module 334 and from the instantaneous receiver module 328. According to one embodiment, the subtraction module 340 calculates a difference between the value stored in the product module 334 and the single instantaneous receiver value (Rx−(Tx*(filtered Rx/filtered Tx)), which is stored in an adjusted receiver signal module 342.

The signal stored in the adjusted receiver signal module 342 is therefore stripped of interference signals that are introduced into the system 100 by power lines or other interference sources and subsequently transmitted by the transmitter 216. The interference signals may include sudden spikes in electrical current or other fluctuations on the power lines that deteriorate system performance, including causing the receiver to generate false alarm signals.

The interference detector and canceling circuit 105 removes interference signals detected at the receiver that are synchronously related to the interference signals introduced at the transmitter. In other words, the interference detector and canceling circuit 105 relies on a ratio between the receiver signal levels and the transmitter signal levels being constant throughout a detection period to remove interference signals. Furthermore, the coherent relationship between the transmitted signals and received signals may be applied to reduce false alarm signals resulting from power line dips.

The interference detector and canceling circuit 105 detects interference signals introduced through the metal detection system transmitter and cancels the interference signals at the metal detection system receiver to reduce occurrences of false alarm signals, improve signal to noise ratios and provide other advantages. The noise reduced signal stored in the adjusted receiver signal module 334 is provided to the metal detection system 104 to minimize false alarm alerts and improve overall system performance.

The invention can be realized in hardware, software, or a combination of hardware and software. Any kind of computing system, or other apparatus adapted for carrying out the methods described herein, is suited to perform the functions described herein.

A typical combination of hardware and software could be a specialized computer system having one or more processing elements and a computer program stored on a storage medium that, when loaded and executed, controls the computer system such that it carries out the methods described herein. The invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A system for canceling interference signals from a received signal, the system comprising:
   a ratio module, the ratio module receiving as input a ratio of a filtered receiver output signal level and a filtered transmitter output signal level;
   a product module, the product module receiving as inputs an output of the ratio module and a transmitter output, the product module calculating a product of the output of the ratio module and the transmitter output; and
   an adjusted receiver signal module, the adjusted receiver signal module receiving a difference calculated from the received signal level and the output of the product module.

2. The system according to claim 1, further comprising:
   a transmitter normalizing module, the transmitter normalizing module receiving a plurality of sample transmitter values and calculating a normalized transmitter value for the plurality of sample transmitter values; and
   a transmitter low pass filter in communication with the transmitter normalizing module, the transmitter low pass filter using the normalized transmitter value to determine an average transmitter value.

3. The system according to claim 2, wherein the transmitter low pass filter includes a 50 tap transmitter low pass filter.

4. The system according to claim 3, wherein the 50 tap transmitter low pass filter stores previous transmitter sample values and averages the normalized transmitter value with the previously stored transmitter sample values.

5. The system according to claim 2, further comprising:
   a receiver normalizing module, the receiver normalizing module receiving a plurality of sample receiver values and calculating a normalized receiver value for the plurality of sample receiver values; and
   a receiver low pass filter in communication with the receiver normalizing module, the receiver low pass filter using the normalized receiver value to determine an average transmitter value.

6. The system according to claim 5, wherein the receiver low pass filter includes a 50 tap receiver low pass filter.

7. The system according to claim 6, wherein the 50 tap receiver low pass filter stores previous receiver sample values and averages the normalized receiver value with the previous stored receiver sample values.

8. The system according to claim 1, wherein the adjusted receiver signal module stores signals having interference signals substantially removed, the received signals being metal detection signals.

9. A method for canceling interference signals introduced into a transmitted wireless signal, the method comprising:
   determining a filtered transmitter value;
   determining a filtered receiver value from a received signal;
   calculating a ratio of the filtered receiver value and the filtered transmitter value;
   multiplying a real-time transmitter value by the ratio to produce a product value;
   calculating a difference between the product value and a real-time receiver value, the real-time receiver value corresponding to the received signal; and
   providing a corrected receiver value, the corrected receiver value cancelling interference signals introduced into the transmitted signal.

10. The method according to claim 9, further comprising applying a transmitter 50 tap low pass filter to generate the filtered transmitter value from the real-time transmitter value.

11. The method according to claim 10, further comprising:
    storing previous real-time transmitter values in the transmitter 50 tap low pass filter;
    averaging the real-time transmitter value and the previously stored real-time transmitter values; and
    providing a single output for the transmitter 50 tap low pass filter.

12. The method according to claim 9, further comprising applying a receiver 50 tap low pass filter to generate the filtered receiver value from the real-time receiver value.

13. The method according to claim 12, further comprising:
    storing previous real-time receiver values in the receiver 50 tap low pass filter;
    averaging the real-time receiver value and the previously stored real-time receiver values; and
    providing a single output for the receiver 50 tap low pass filter.

14. A security system, comprising:
    at least one antenna;
    an electronic surveillance system, the electronic surveillance system using the at least one antenna to detect the presence of active markers;
    a metal detection system, the metal detection system using the at least one antenna to detect metallic objects, the metal detection system comprising:
      a ratio module, the ratio module receiving as input a ratio of a filtered receiver output signal level and a filtered transmitter output signal level;
      a product module, the product module receiving as inputs an output of the ratio module and a transmitter output, the product module calculating a product of the output of the ratio module and the transmitter output; and
      an adjusted receiver signal module, the adjusted receiver signal module receiving a difference calculated from the received signal level and the output of the product module.

15. The security system according to claim 14, the metal detection system further comprising:
    a transmitter normalizing module, the transmitter normalizing module receiving a plurality of sample transmitter values and calculating a normalized transmitter value for the plurality of sample transmitter values; and
    a transmitter low pass filter in communication with the transmitter normalizing module, the transmitter low pass filter using the normalized transmitter value to obtain an average transmitter value.

16. The security system according to claim 15, wherein the transmitter low pass filter includes a 50 tap transmitter low pass filter.

17. The security system according to claim 16, wherein the 50 tap transmitter low pass filter stores previous transmitter sample values and averages the normalized transmitter value with the previously stored transmitter sample values.

18. The security system according to claim 14, the metal detection system further comprising:
    a receiver normalizing module, the receiver normalizing module receiving a plurality of sample receiver values and calculating a normalized receiver value for the plurality of sample receiver values; and
    a receiver low pass filter in communication with the receiver normalizing module, the receiver low pass filter using the normalized receiver value to obtain an average transmitter value.

19. The security system according to claim 18, wherein the receiver low pass filter includes a 50 tap receiver low pass filter.

20. The security system according to claim 19, wherein the 50 tap receiver low pass filter stores previous receiver sample values and averages the normalized receiver value with the previously stored receiver sample values.

* * * * *